US008906553B1

(12) United States Patent
Hagh et al.

(10) Patent No.: US 8,906,553 B1
(45) Date of Patent: Dec. 9, 2014

(54) HIGH VOLTAGE CATHODE MATERIAL FOR LI-ION BATTERIES (75) Inventors: Nader Marandian Hagh, Franklin Park, NJ (US); Farid Badway, Old Bridge, NJ (US); Ganesh Skandan, Easton, PA (US)

(73) Assignee: NEI Corporation, Somerset, NJ (US)

( * ) Notice: Subject to any disclaimer, the term of this patent is extended or adjusted under 35 U.S.C. 154(b) by 915 days.

(21) Appl. No.: 13/036,493

(22) Filed: Feb. 28, 2011

Related U.S. Application Data (60) Provisional application No. 61/308,437, filed on Feb. 26, 2010.

(51) Int. Cl.
*H01M 4/13* (2010.01)

(52) U.S. Cl.
USPC ..... 429/231.1; 429/224; 429/223; 252/521.2; 423/306; 423/315; 423/594.3; 423/599; 423/594.15; 427/58

(58) Field of Classification Search
USPC ............ 429/224, 223, 231.1; 252/521.2; 423/306, 315, 594.3, 599, 594.15; 427/58
See application file for complete search history.

(56) References Cited

U.S. PATENT DOCUMENTS

| | | | | |
|---|---|---|---|---|
| 6,949,233 | B2 * | 9/2005 | Kweon et al. | 423/179.5 |
| 2009/0068563 | A1 * | 3/2009 | Kanda et al. | 429/306 |

* cited by examiner

*Primary Examiner* — Laura Weiner
(74) *Attorney, Agent, or Firm* — William L. Botjer (57) ABSTRACT

A cathode electrode material for use in rechargeable Li-ion batteries, based on the integration of two Li-based materials of NASICON- and Spinel-type structures, is described in the present invention. The structure and composition of the cathode can be described by a core material and a surface coating surrounding the core material, wherein the core of the cathode particle is of the formula $LiMn_{2-x}Ni_xO_{4-\delta}$ ($0.5 \leq x \leq 0$ & $0 \leq \delta \leq 1$) and having a spinel crystal structure, the surface coating is of the formula $Li_{1+x}M_xTi_{2-x}(PO_4)_3$ (M: is a trivalent cation, $0.5 \geq x \geq 0$) having a NASICON-type crystal structure.

7 Claims, 6 Drawing Sheets

HIGH VOLTAGE CATHODE MATERIAL FOR LI-ION BATTERIES

CROSS REFERENCE TO RELATED APPLICATIONS

This application claims priority of U.S. provisional application No. 61/308,437 filed Feb. 26, 2010.

STATEMENT OF GOVERNMENT SUPPORT OF INVENTION

The work leading to the present application was done as part of DOE Grant Number: DE-SC0002249. The government has certain rights in the invention.

BACKGROUND OF THE INVENTION

This invention relates to formulations for cathode materials for use in batteries and more particularly to cathode materials for use in rechargeable Li-ion batteries that are charged to high voltage.

Several failure mechanisms have been reported in Li-ion batteries, which limit their performance in practical applications. One of the most important failure modes is the one that involves the surface of the cathode material. This mode of failure mainly arises from catalyzing effects of the transition metals present in the cathode electrode, which can oxidize the electrolyte. This process, which can happen even at low voltage (<4V), forms an insulating layer on electrodes, limits easy ion transport, and decreases the electronic conductivity. The outcome of this process leads to a rise in the impedance of the cathode, resulting in massive cell failure.

One approach to prevent this phenomenon is to modify the surface of the cathode particles with a thin coating of an oxide compound with preferably high conductivity. An ideal surface-modified cathode material will have good ionic and electronic conductivity, and in addition will have a stable cathode-electrolyte interface. Further, the coated material also acts as a protective layer against acid attacks, such as HF, and minimizes metal ion dissolution. Examples of coatings on $LiMn_2O_4$ spinel material include MgO [K. Amine, C. H. Chen, J. Liu, M. Hammond, A. Jansen, D. Dees, I. Bloom, D. Vissers, G. Henriksen, *J. Power Sources*, 97-98, 684-687 (2001)], $Al_2O_3$ [A. M. Kannan, A. Manthiram, *Electrochem. & Solid State Lett*, 5, A167 (2002); H. Liu, Y. P. Wu, E. Rahm, R. Holze, H. Q. Wu, *J. Solid State Electrochem*, 8, 450 (2004)], $ZrO_2$ [S. C. Park, Y. M. Kim, Y. M. Kang, K. T. Kim, P. S. Lee, J. Y. Lee, *J. Power Sources*, 103, 86 (2001)], and ZnO [Y. K. Sun, Y. S. Lee, M. Yoshio, K. Amine, *Electrochem. Solid State Lett.* 5, A99 (2002)]. These coatings, despite improving the stability and cycle life of the cathode materials, are considered as a non-uniform coating. Additionally, such coatings only partially cover the surface of the cathode particles. This leaves the surface of uncoated cathode particle ("weak spots") vulnerable to reaction with the electrolyte, which adversely affects the stability of the Li-ion cell. In addition, these coatings are passive (i.e. inactive), and do not change the physical and chemical properties of the core material. The stability issue is exacerbated in cathodes when charged to a high voltage, i.e. >4V. Therefore, to eliminate the drawbacks of the available surface modification procedures, a more effective method is required to enhance the stability of the electrode-electrolyte interface.

SUMMARY OF THE INVENTION

This invention is directed to a new cathode material for use in batteries wherein the particle is in the form of a core material and a surface coating surrounding the core material, and wherein the core of the cathode particle is of the formula $LiMn_{2-x}Ni_xO_{4-\delta}$ ($0.5 \leq x \leq 0$ & $0 \leq \delta \leq 1$), and the surface coating is of the formula $Li_{1+x}M_xTi_{2-x}(PO_4)_3$ (M: is a trivalent cation, $0.5 \geq x \geq 0$. The cathode material in the present invention also involves the incorporation of two Li-based structures, namely NASICON (an acronym for "Sodium Super-Ionic Conductor") —type structure on the surface and Spinel-type structure in the core, into one cathode material referred to herein as "NASPINEL". NASPINEL is a new material, not used in Li-ion battery cathodes until now.

The NASICON-type structure with the general formula of $Li_{1+x}M_xTi_{2-x}(PO_4)_3$ (i.e. M=Al) is formed by corner sharing of $TiO_6$ or $MO_6$ octahedra and $PO_4$ tetrahedra with the space group of R-3C. The Spinel-type structure with general formula of $LiM_2O_4$ (M: Mn and Ni) is composed of $MO_6$ octahedra with the space group of either Fd-3m or $P4_332$. The former is designed to provide a thin protective layer with high conductivity, while the latter structure serves as a high voltage cathode providing high energy density. The key characteristics of the NASICON-type material are high conductivity, low melting point and high degree of surface wetting, which provide complete and uniform particle coverage with the possibility of composite structure at the interface. Scanning electron microscopy (SEM) analysis of NASPINEL shows that the entire surface of the cathode particle is covered by a thin layer of NASICON-type material. Additionally, there was a commensurate decrease in the surface area of the coated material, as measured by the BET (Brunauer Emmett Teller) nitrogen adsorption method, which provides further confirmation for the presence of a uniform coating.

The NASICON-type structure is an ionically conductive material which forms a uniform and stable thin coating on the surface of the spinel particles. The high wetting characteristics of NASICON coating material on pristine spinel electrode particle provides uniform and chemically protective surface coverage. A Li-based coating agent used for spinel material reported in this disclosure, in principle, is also applicable to other manganese based cathode materials with two dimensional (e.g. layered structure) or three dimensional structures (e.g. spinel, olivine and etc.)

The improvement in the electrochemical performance of the NASPINEL relative to the pristine Spinel material can be attributed to higher stability and good transport properties, provided by the NASICON-type material. Structural and electrochemical results suggest the possibility of spinel-NASICON interaction at the interface which could play a key role in the improved electrochemical properties of NASPINEL material.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Overview

In a Li-ion cell, the amount of delivered energy is generally determined by the mechanism of reaction and the electrochemical potentials of the cathode/anode electrodes. The mechanism of redox (reduction and oxidation) reaction can be insertion, displacement or conversion which determines the number of electrons which can be exchanged between the two electrodes. So far, the insertion-based systems have shown a high degree of reversibility and columbic efficiency, relative to conversion/displacement systems, although they intrinsically exchange lower number of electrons.

One of the most promising high voltage insertion cathodes is cation doped $LiM_xMn_{2-x}O_4$ spinel (M: Ni, Cr, Fe, Cu, Co, or co-doping with Ni—Mo, Ni—Mg, and Ni—Fe in the octahedral sites of Mn). The electrochemical performance of $LiM_xM_{2-x}O_4$ spinel is directly affected by the type and amount of doped ions, either in the ordered 4b and 12d octahedral sites (P4$_3$32 space group) or in randomly occupied 16d sites (Fd3m) of the cubic structure. Among different dopants, Ni doped spinel ($LiNi^{II}_{0.5}Mn^{IV}_{1.5}O_4$; LMNO) is of special interest since it shifts the voltage profile of the parent composition ($LiMn_2O_4$) to a higher potentials by introducing new voltage plateaus at 4.4-4.7 V and 4.7-5.0V (corresponding to $Ni^{II}/Ni^{III}$ and $Ni^{III}/Ni^{IV}$ redox reactions). There is however still an opportunity to introduce structural modifications that lead to near theoretical capacity with good cycling stability.

The general lack of stability for high voltage cathode materials is associated with electrolyte-electrode interface side reactions which control the stability of the cell. There have been numerous reports on minimizing the electrolyte-electrode interface reactivity by coating the surface of the cathode through thin layer of ZnO [Y.-K. Sun, Y.-S. Lee, M. Yoshio, and K. Amine, *Electrochem. Solid-State Letts.*, 5 (5) A99-A102 (2002)], SiO$_2$ [Y. Fan, J. Wang, Z. Tang, W. He, J. Zhang, *Electrochimica Acta*, 52, 3870-3875 (2007)], Al$_2$O$_3$, MgO, LiCoO$_2$ [A. M. Kannan, A. Manthiram, *Electrochem. Solid-State Letts*, 5 (7) A167-A169 (2002)], and Au [J. Arrebola, A. Caballero, L. Hernan, J. Morales, E. Rodriguez Castellon, and J. R. Ramos Barrado, *J. Electrochem., Soc.*, 154 (3) A178-A184 (2007)], or surface treatment of the cathode by mild acidic solutions performed by Thackeray et al and the author of current patent. [S.-H. Kang and M. M. Thackeray, *J. Electrochem., Soc.*, 155 (4) A269-A275 (2008) and N. Marandian Hagh, F. Cosandey, S. Rangan, R. Bartynski, and G. G. Amatucci, *J. Electrochem., Soc.*, 157 (3) A305-A319 (2010)]. In all these efforts, the improved electrode-electrolyte interface stability was achieved by modification in the surface chemistry of the electrode.

The Present Material

An alternative way to achieve cathode stability is the structurally compatible coating with the formation of a composite material at interface. The resulting new cathode material described herein is composed of two Li-based materials, which are chemically bonded to each other. The first component is a Ni-doped spinel material ($LiMn_{2-x}Ni_xO_{4-\delta}$; 0≤x≤0.5 0<δ<1) which was synthesized by a solid state process.

The second component of the new cathode is the NASICON-type ion conducting material, namely $Li_{1+x}Al_xTi_{2-x}(PO_4)_3$ (LATP; 0≤x≤0.5) which is composed of a nanometers thick conductive agent on the surface of the spinel material. The structure framework is based on two MO$_6$ (M: Ti or Al) in octahedral which are connected to three phosphate groups (PO$_4$) through shared oxygens. More specifically, $Ti^{4+}$ and $Al^{3+}$ ions occupy the 12c sites, $Li^+$ ions occupy the 6b site of octahedral and P ions reside in 18e sites of tetrahedral. It should be noted that $Al^{3+}$ can be replaced with other trivalent cations, e.g., $Fe^{3+}$, $Sc^{3+}$, $La^{3+}$, $B^{3+}$, $Ga^{3+}$, $Y^{3+}$, or $Yb^{3+}$.

Figure 6:
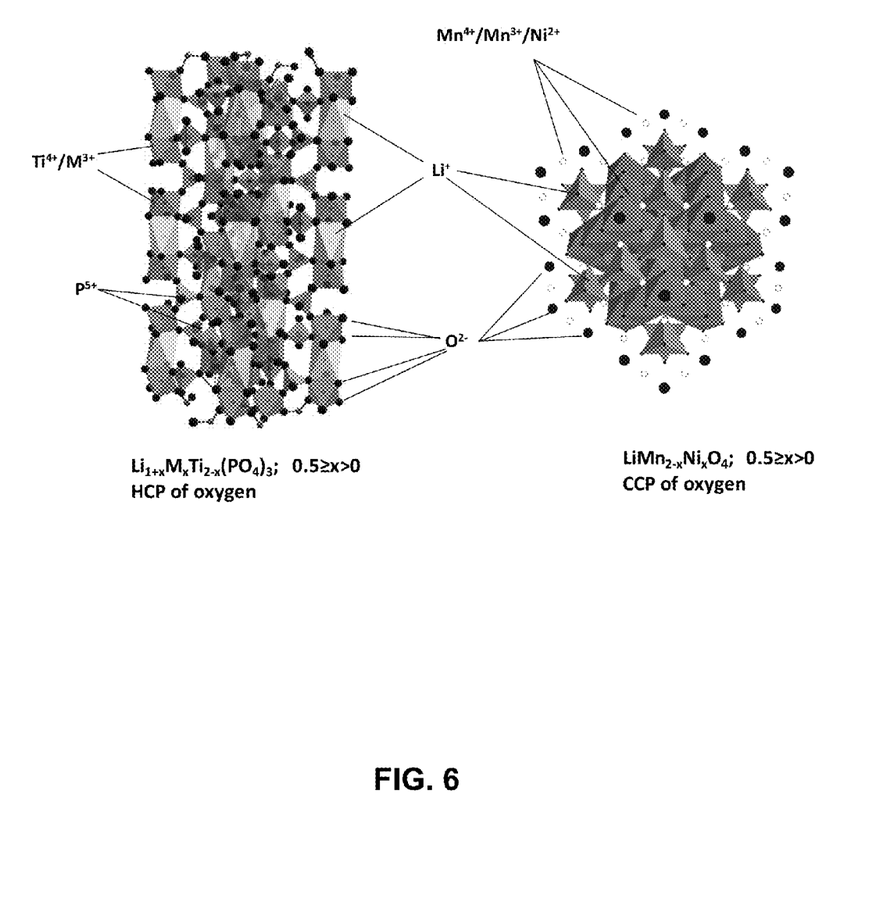
FIG. 6 shows the crystal structure of spinel and olivine materials

Despite the fact that the crystal systems of spinel and olivine structures are different (cubic versus hexagonal, respectively), there is significant similarity between the two structures representing a generic formula of $XY_2O_4$ (where X & Y are cations). Both structures are formed based on closed packed oxygen atoms with the arrays of octahedral and tetrahedral sites (FIG. 6). Evidence of the structural similarity can be found in nature (earth's mantle) where the olivine type structures such as $Ni_2SiO_4$ and $Fe_2SiO_4$ are transformed into a denser spinel structure under high temperature and pressure (A. E. Ringwood, Nature, Volume 198, Issue 4875, pp. 79-80, 1963). During this transformation, the coordination of the cations does not change; however, the density of the unit cell increases by about 8%. This implies that the structural compatibility of the two structures in the present invention leads to improved structural integrity of the cathode particle, and hence enhanced capacity and cycling stability over the pristine spinel material.

Formation of the spinel material during heat treatment is accompanied by oxygen loss at annealing temperatures above 730° C. This oxygen loss typically changes the charge balance in spinel by forcing the metal ions to a lower oxidation state. In the case of spinel, this leads to partially reduction of tetravalent manganese to trivalent manganese as shown in Eq. 1.

$$LiMn^{IV}_{2-x}Ni^{II}_xO_4 \rightarrow LiMn^{III}_\alpha Mn^{IV}_{2-x-\alpha} Ni^{II}_x O_{4-\delta} + \delta/2 O_2 \quad 1>\delta>0;\ 0.5\geq x\geq 0;\ 0.5>\alpha>0$$ [Eq. 1]

The existence of the trivalent manganese was confirmed through measurement of the lattice parameter, which was obtained by X-ray diffraction (XRD). In fact, a replacement of larger trivalent manganese ($Mn^{3+}$) by the smaller tetravalent manganese ($Mn^{4+}$) can cause an expansion in lattice which was detected in the spinel that was synthesized at temperatures below and above 730° C. In addition to the XRD results, existence of the trivalent manganese can be observed from the voltage profile of the pristine spinel. The curvature in the discharge voltage profile (see FIG. 1) of spinel at potential range of 4.0-4.1V indicates the reduction of tetravalent to trivalent manganese.

Figure 2:
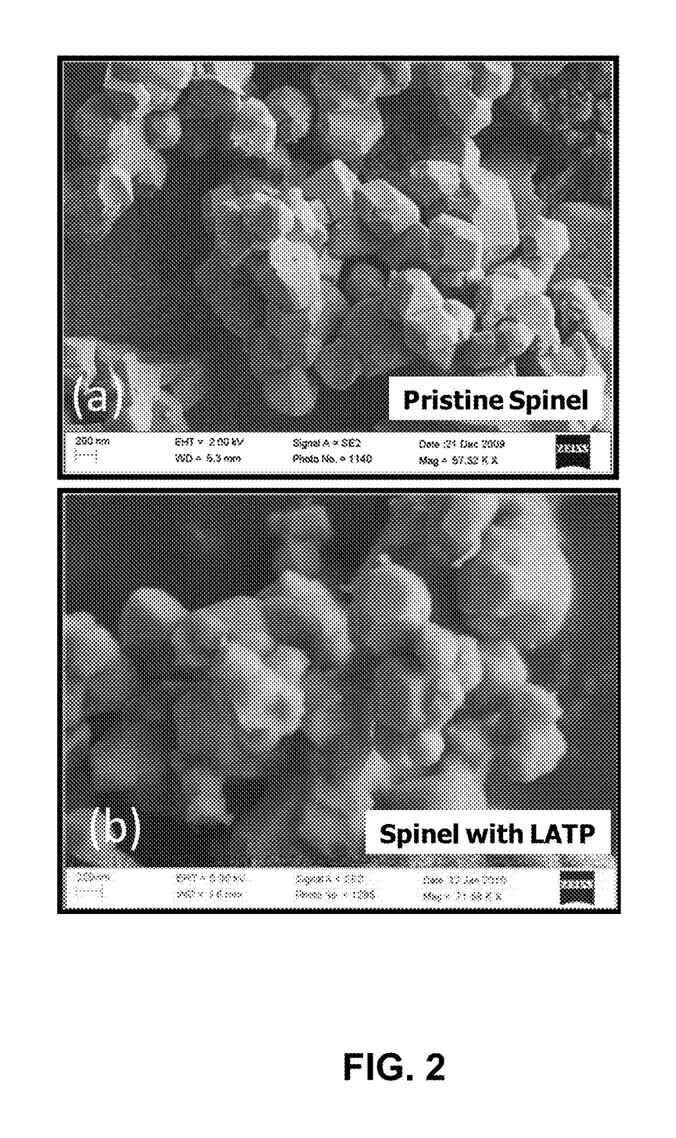
FIG. 2 is a scanning electron microscope (SEM) image of cathode powders, pristine cathode material (Spinel) and the NASPINEL cathode.

It was surprising to observe that the introduction of LATP into the spinel system reverses the manganese reduction process and partially converts the trivalent manganese to tetravalent manganese (See Eq. 2). This was confirmed by decrease in the unit cell of the spinel, as well as depression of the 4.0V region in the discharge voltage profile of LATP spinel (FIG. 2).

$$LiMn^{III}_\alpha Mn^{IV}_{2-x-\alpha} Ni^{II}_x O_{4-\delta} \rightarrow LiMn^{III}_\beta Mn^{IV}_{2-x-\beta} Ni^{II}_x O_{4-\delta}\ \alpha>\beta$$ [Eq. 2]

This indicates that the LATP is not just a passive coating. Instead, it actively changes the oxidation state of the manganese atoms in the bulk. In addition, a decrease in number of trivalent manganese lowers the number of John-Teller distortions in the octahedral sites, and therefore minimizes the well known phenomenon of Mn disproportionation in the NASPINEL, the subject of the present invention.

A general method to practice the invention is as follows:

A high voltage cathode powder is first prepared using any synthesis method. The present invention describes a solid state method to produce $LiMn_{2-x}Ni_xO_{4-\delta}$ (0≤x≤0.5 0<δ<1)

particles. Since the same crystal structure can be obtained by using any synthesis method, the present invention can be practiced on spinel compounds prepared by other methods, e.g., solution precipitation. The present invention focuses on high voltage spinel with the generic composition of $LiMn_{2-x}Ni_xO_{4-\delta}$ ($0 \leq x \leq 0.5$ $0 < \delta < 1$). Those skilled in the art would know that the present invention can be just as easily applied to spinel compounds in general, and that the introduction of dopants such as Ni, Cr, Fe, Cu, Co, Mg, or other cations, either individually or together, does not fundamentally change the spinel crystal structure.

As a second step to practicing the invention, a precursor compound that can be converted to an electrically conducting compound with a NASICON structure is prepared. A solution process has been used in the present invention. The specific compound used in the present invention is based on a lithium aluminum titanium phosphate (LATP) compound. Those skilled in the art will know that other synthesis methods could lead to the formation of compounds with the NASICON structure, and that other lithium containing compounds could be used as well. The third step in the invention is to mix the spinel particles with the precursor material described in the second step. The fourth step in the invention is to heat treat the dried mixture at a suitable temperature in order to produce the new cathode material, NASPINEL. The preferred temperature range for the heat treatment is between 400° C. and 800° C., and more preferably between 450° C. and 550° C.

Example 1

Nickel manganese oxide spinel was prepared by mixing 77.7 g of $MnO_2$ and 22.3 g of NiO in dried Acetone. The mixture was dried at 120° C. for 12 hours, and heat treated at 900° C. for 5 hours to form $Ni_{0.67}Mn_2O_4$ powder. In the second step, 18.4 g of $Ni_{0.67}Mn_2O_4$ powder was mixed with 4 g of $Li_2CO_3$ and heat treated at 800° C. for 12 hours to form the final spinel material of composition $LiMn_{1.5}Ni_{0.5}O_4$. As synthesized spinel had primary particle size of 0.3-0.5 micron with secondary particle size of less than 10 microns. The primary particle size refers to the size of the individual particle visible in an electron microscope image of the powder. The secondary particle size refers to the aggregate particle size, which is a collection of primary particles sintered together.

The LATP material with chemical formula of $Li_{1.4}Al_{0.4}Ti_{1.6}(PO_4)_3$ was synthesized separately by mixing three solutions (labeled "A", "B", and "C") through wet chemical process. Solution "A" was prepared by dissolving 16.09 g of citric acid in 210 mL of de-ionized water followed by addition of 11.9 g titanium isopropoxide. The resultant mixture was refluxed for 4 hours to obtain a clear solution. Solution "B" was first prepared by addition of 9.1 g of citric acid to 183.7 mL of de-ionized water. After complete dissolution of citric acid, 2.5 g of $LiNO_3$ and 9.1 g of $NH_4H_2PO_4$ were added to the citric acid solution. Solutions "A" and "B" were mixed together for half an hour which was labeled as solution "D". Solution "C" was prepared in 52.7 mL of de-ionized water by dissolving 9.1 and 4 g of $Al(NO_3)_3$ and citric acid, respectively. The final solution was obtained by mixing the two solutions "D" and "C" for half hour, followed by addition of 18.9 g of diethylene glycol (DEG). After completion of mixing, the pH was raised to 7.0 using 14.6N ammonium hydroxide. The final LATP solution was a transparent solution which could be kept at room temperature, with no precipitation or degradation.

Figure 1:
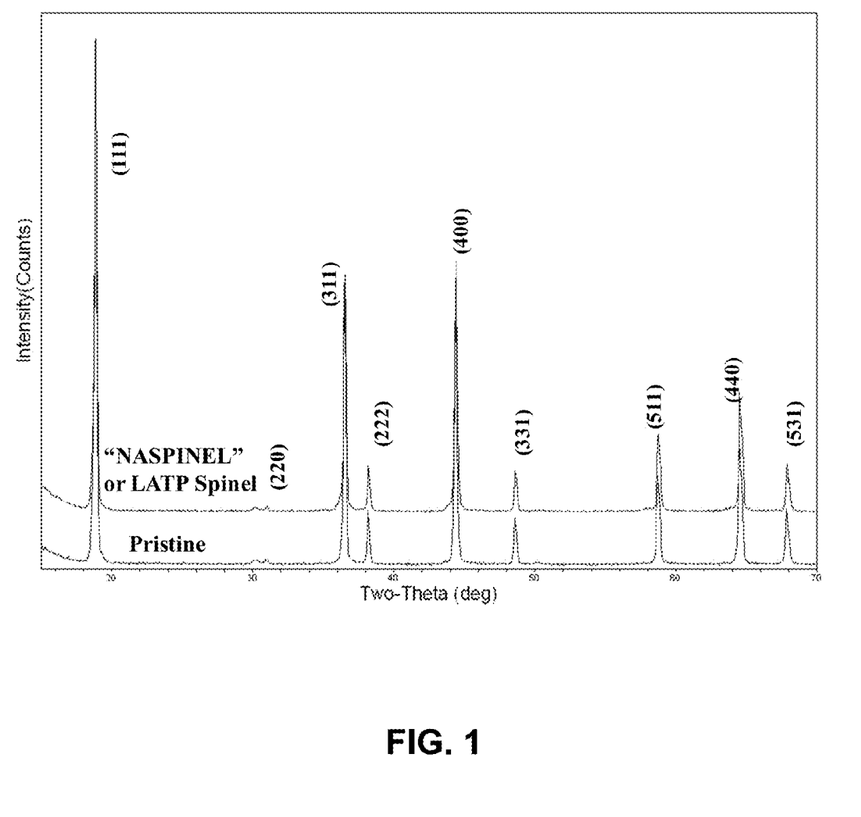
FIG. 1 is a comparison of the X-ray diffraction (XRD) spectra of the pristine cathode material (Spinel) and the NASPINEL cathode.

The NASPINEL cathode powder was prepared by dispersing 80 g of the spinel powder in 120 mL of the LATP solution representing about 3 wt % of the NASICON-type coating in the cathode particle using the rotary evaporation process. It should be noted that it is possible to form a continuous coating even when the concentration of LATP is about 1 wt %. It is just that the coating will be thin. Similarly, a higher weight percentage of LATP (as much as 5 weight percent) can be used to yield similar results. After dispersing the cathode in the LATP solution, the solution was ultrasonicated for 15 minutes and heat treated in the oven at 150° C. for 4 hours. The final heat treatment was performed in a furnace at 500° C. for 5 hours in air. The X-ray diffraction pattern of the final NASPINEL with pure spinel phase is shown in FIG. 1. As shown, both pristine and NASPINEL were phase pure powders with cubic structure (space group of Fd-3m). Since the small concentration of LATP (~3 wt %) does not result in distinguishable diffraction peaks, no LATP peak was detected in the X-ray diffraction pattern. In terms of long range ordering of LATP, and due to the temperature dependence of structural ordering, no specific degree of crystallinity was detected in NASPINEL. Although both materials showed no significant change in the diffraction patterns, a reduction in lattice parameter of NASPINEL versus pristine material indicates the possibility of increase in the number of tetravalent manganese.

Scanning electron microscopy (SEM) images of the pristine spinel and NASPINEL is shown in FIG. 2. As shown, the spinel particles are well-faceted polyhedron particles with a high degree of crystallinity (from X-ray pattern). The sharp edges in the pristine powder were clearly observed with isotropic morphology, representing the cubic crystal structure. These sharp edges are rounded in the NASPINEL material, the difference being attributed to the presence of LATP on the surface of the cathode particles (FIG. 2). This also indicates that the NASICON-type structure has effectively wetted the surface of the spinel material and hence has fully covered the surface. The NASPINEL material showed a decrease in the surface area, and increase in the average particle size over the pristine spinel. By considering the difference in the primary particle size between the pristine and the NASPINEL particles, it is estimated that the thickness of the coating is less than 50 nm.

Figure 3:
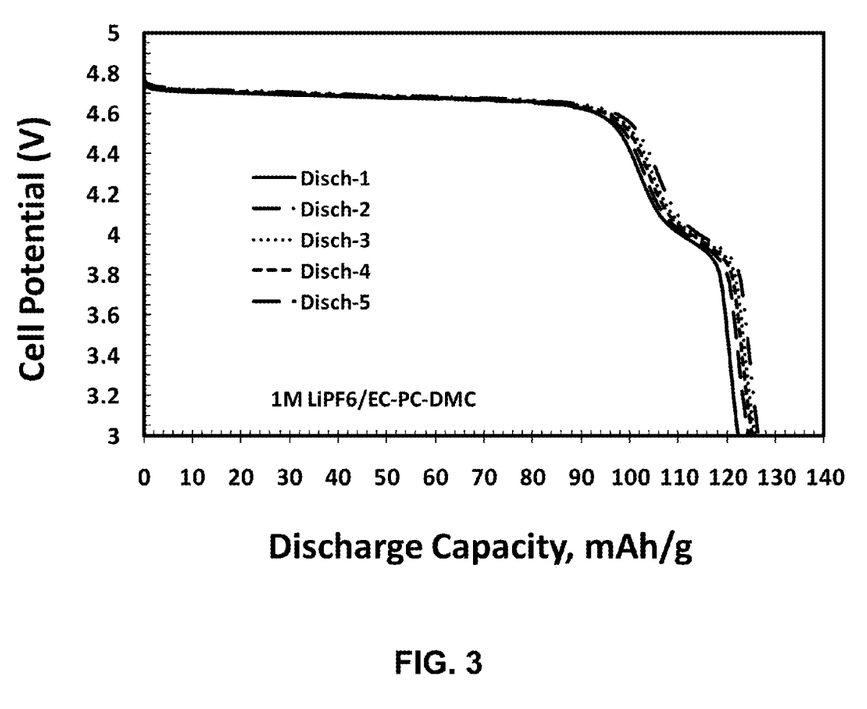
FIG. 3 is a discharge voltage profile (initial five cycles) of the pristine spinel at room temperature.
Figure 4:
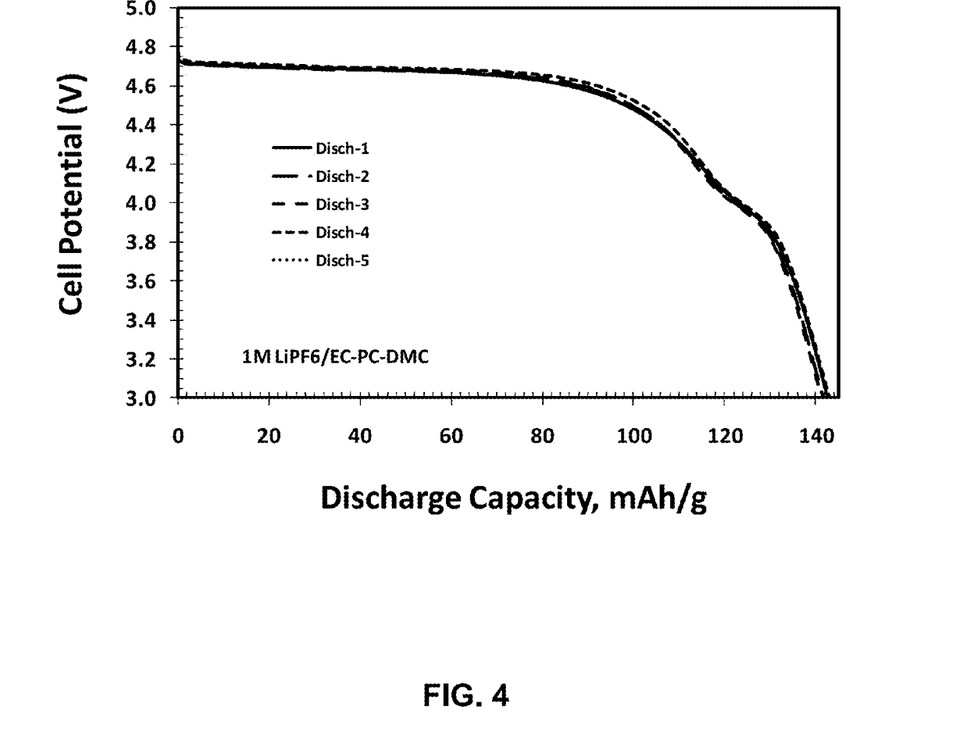
FIG. 4 is a discharge voltage profile (initial five cycles) of the NASPINEL at room temperature.

Galvanostatic half cell cycling test of the pristine spinel and NASPINEL materials was performed at room temperature. FIGS. 3 and 4 show the initial five cycles of the pristine and NASPINEL cells, respectively. As shown in FIG. 3, the pristine spinel cell showed an initial discharge capacity of 122 mAh/g within the cut-off voltage of 4.8-3.0V. The main characteristics of this voltage profile were the formation of minimum impedance upon cycling. In addition, there is a noticeable voltage plateau observed at ~4V which is due to the reduction of Mn ions, from $Mn^{4+}$ to $Mn^{3+}$, during $Li^+$ intercalation. The capacity retention after five cycles was 124.6 mAh/g.

FIG. 4 shows the galvanostatic cycling of the NASPINEL half cell. As shown, the initial discharge capacity of the cell was increased to more than 140 mAh/g, approaching the theoretical discharge capacity of 147 mAh/g. This translates into ~17% improvement in discharge capacity. In addition to that, the voltage plateau at 4V was noticeably depressed. This intriguing phenomenon could suggest the larger extent of interaction between LATP and spinel in NASPINEL, which could reduce the concentrations of trivalent manganese. This is confirmed by the results of X-ray diffraction where the lattice parameters of pristine spinel materials were reduced up to 0.26% upon introduction of conductive agent, namely LATP.

Figure 5:
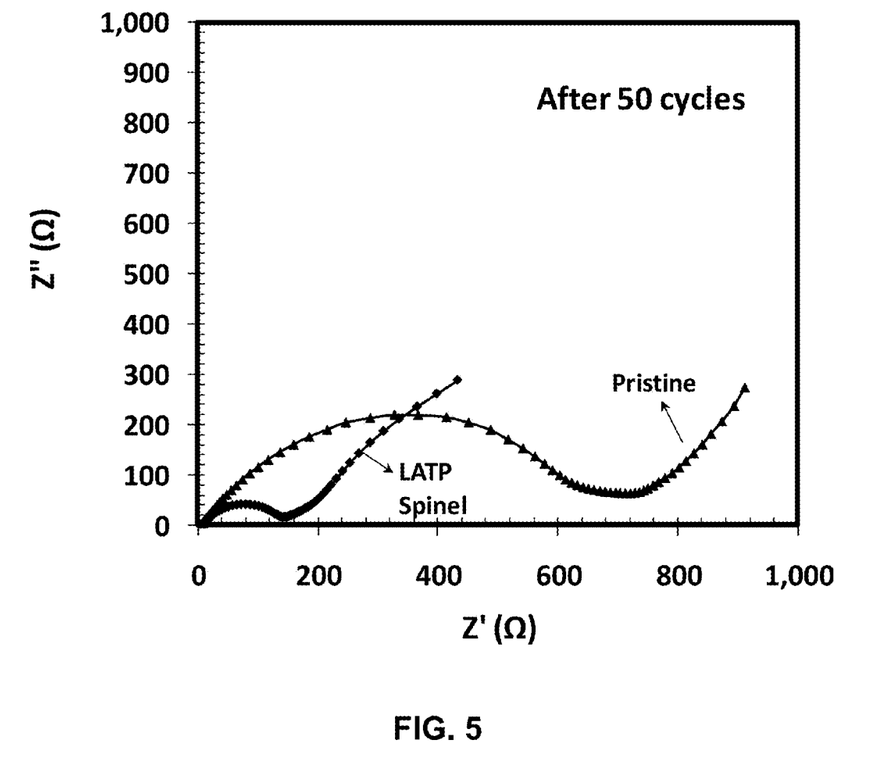
FIG. 5 is an electrochemical impedance spectroscopy (EIS) of the pristine and NASPINEL cathodes after 50 cycles.

The key rationale for using LATP was the advantage of having high transport properties particularly ionic conductivity in the pristine spinel. In order to explore this, electrochemical impedance spectroscopy (EIS) of the pristine and NASPINEL cells were measured after 50 cycles. FIG. 5 shows the EIS measurements of half cells. The build-up of impedance after 50 cycles for NASPINEL was noticeably reduced (more than 70%) relative to the cell using the pristine spinel. This implies that the utilization of LATP as a conductive agent has improved the conductivity of the Spinel particles.

Example 2

A solid state process was used to synthesize the cathode material. 77.7 g of $MnO_2$ and 22.3 g of NiO was mixed in dried Acetone. The mixture was dried at 120° C. for 12 hours, and heat treated at 800° C. for 5 hours to form $Ni_{1-x}Mn_{2-x}O_4$ ($x \leq 0.33$) spinel powder. In the next step, 18.4 g of $Ni_{1-x}Mn_{2-x}O_4$ powder was mixed with 4 g of $Li_2CO_3$ and heat treated at 800° C. for 12 hours to form the final spinel material. The results of XRD showed that the major phase in the powder was that of $Ni_{1-x}Mn_{2-x}O_4$ ($x \leq 0.33$) spinel. This suggests that phase pure spinel powder can be obtained by choosing an appropriate temperature that is greater than 800° C. but less than or equal to 900° C. The rest of the process was similar to that in Example 1.

Example 3

The LATP solution was synthesized by mixing three solutions (labeled "A", "B", and "C") through a wet chemical process. Solution "A" was prepared by dissolving 16.09 g of citric acid in 210 mL of de-ionized water followed by addition of 11.9 g titanium isopropoxide. The resultant mixture was refluxed for 4 hours to obtain a clear solution. Solution "B" was first prepared by addition of 9.1 g of citric acid to 183.7 mL of de-ionized water. After complete dissolution of citric acid, 2.5 g of $LiNO_3$ and 9.1 g of $NH_4H_2PO_4$ were added to the citric acid solution. Solutions "A" and "B" were mixed together for half an hour which was labeled as solution "D". Solution "C" was prepared in 52.7 mL of de-ionized water by dissolving 9.1 and 4 g of $Al(NO_3)_3$ and citric acid, respectively. The final solution was obtained by mixing the two solutions "D" and "C" for half hour, followed by addition of 18.9 g of diethylene glycol (DEG). After completion of mixing, the pH was about 2.0 and the solution was not transparent. This is because some precipitation may have occurred, which suggests that the desired pH range for forming a transparent solution is likely greater than 2.0 and less than or equal to 7.0. The rest of the process was similar to that in Example 1.

As is well known for formula parameters set forth herein are for example only, such parameters can be scaled and adjusted in accordance with the teaching of this invention. This invention has been described with respect to preferred embodiments. However, those skilled in the art will recognize, modification and variations in the specific details which have been described and illustrated may be restored to without departing from the sprit and scope of the invention as defined in the appended claims.

What is claimed is:

1. A cathode material for use in lithium ion batteries, the material being in the form of a core material and a surface coating surrounding the core material, wherein the core of the cathode particle is of the formula $LiMn_{1.5}Ni_{0.5}O_4$ having a spinel crystal structure surrounded by a surface coating of the formula $Li_{1.4}Al_{0.4}Ti_{1.6}(PO_4)_3$ having a NASICON-type crystal structure.

2. The cathode material as claimed in claim 1 wherein the material has a primary particle size of 0.3-0.5 microns.

3. The cathode material as claimed in claim 1 wherein the thickness of the surface coating is between 2 and 10 nm.

4. The cathode material as claimed in claim 1 wherein the percentage weight of the NASICON-type surface coating is between 1 and 3% of the total weight of the cathode material.

5. The cathode material as claimed in claim 1 wherein the NASICON-type surface of the cathode particle is a lithium ion conductor.

6. The cathode material as claimed in claim 1 wherein the NASICON-type surface coating of the cathode particle has no specific degree of crystallinity.

7. The cathode material as claimed in claim 1 wherein the material has a first cycle electrochemical discharge capacity of 122-147 mAh/g.

* * * * *